E. PRYOR.
FIFTH WHEEL FOR VEHICLES.
APPLICATION FILED SEPT. 5, 1911.
1,016,580.
Patented Feb. 6, 1912.
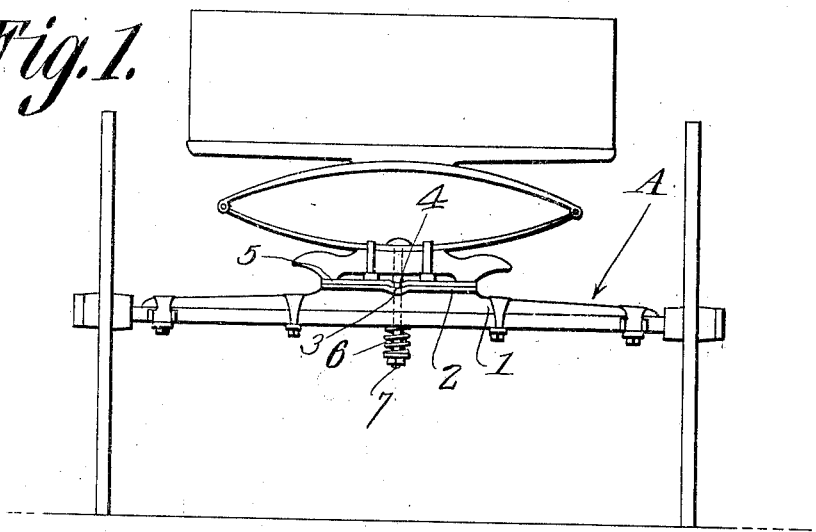
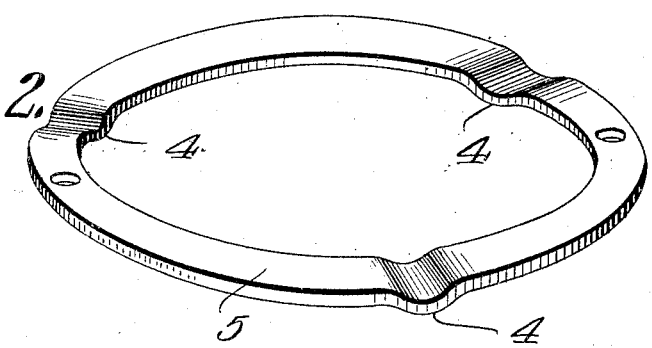
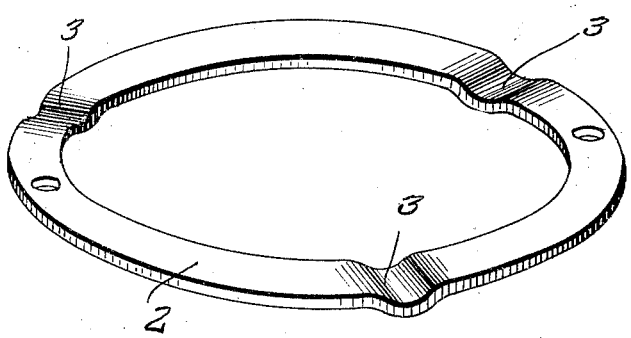
Witnesses
Frank B. Wooden
E. Walton Brewington
Inventor
Edward Pryor,
By Henry F. Brewington.
Attorney

UNITED STATES PATENT OFFICE.

EDWARD PRYOR, OF BALTIMORE, MARYLAND.

FIFTH-WHEEL FOR VEHICLES.

1,016,580.     Specification of Letters Patent.     Patented Feb. 6, 1912.

Application filed September 5, 1911. Serial No. 647,493.

*To all whom it may concern:*

Be it known that I, EDWARD PRYOR, a citizen of the United States, residing at Baltimore city, State of Maryland, have invented certain new and useful Improvements in Fifth-Wheels for Vehicles, of which the following is a specification.

My invention relates to fifth wheels for vehicles and the like, and has for its object to provide a wheel of this character so constructed that the difficulty experienced in backing a vehicle in a straight course is to a great extent overcome.

The difficulty in backing a vehicle in a straight course toward some objective point is usually caused by the tendency of the front axle to turn more or less occasioned by the front wheels of the vehicle meeting with some obstacle or by the tendency of the horse to deviate from the course and exert pressure in one direction or the other on the shafts or tongue of the vehicle, and thereby cause the rear end of the vehicle to swerve from its course.

By the use of my invention a great deal of time and labor is saved in the operation of backing a vehicle toward the objective point, as well as the wear and tear on the vehicle, as well as the nervous strain under which a horse labors in the backing of a vehicle is to a great extent obviated.

With these objects in view my invention consists in certain novel features of construction, combinations and arrangement of parts which will be hereinafter more fully described and pointed out in the appended claims.

In order that the invention may be readily understood, it will be specifically described in connection with the accompanying drawings which illustrate a preferred embodiment and in which—

Figure 1 is a front elevation of a vehicle provided with my invention, and Figs. 2 and 3 are perspective views of the top and bottom plates respectively of the improved fifth wheel.

Like reference characters mark the same parts wherever they occur in the several figures of the drawings.

A, indicates the running gear of a vehicle, to the axle 1 of which is secured in any suitable manner the bottom plate 2 of the fifth wheel, the same being provided with a plurality of radial depressions 3, into which a like number of radial projections 4 on the under side of the upper plate 5 are adapted to register when the vehicle is traveling either forward or backward in a straight line. The plate 5 is adapted to be secured to the spring part of the vehicle in any suitable manner; the ordinary king bolt may be used or as shown, a spring 6 may be interposed between the end of the king bolt 7 and the axle 1, that a flexible connection between the two members of the fifth wheel may be obtained.

While I have shown the members 5 and 2 provided with three projections and depressions respectively, and equidistantly spaced apart, it is understood that as many of the projections and depressions may be provided on the respective parts as may be desired, also that they may be of large or small proportions to meet the particular requirements.

It will be obvious that variations may be made in the form and arrangements of the several parts described, without departing from the spirit and scope of the invention, hence I do not wish to limit myself to the exact construction as herein set forth; but, Having fully described my invention, what I claim as new and desire to secure by Letters Patent, is;

1. A fifth wheel for vehicles comprising two plates adapted to be slidably secured together one above the other, the upper plate being provided with radial projections extending from the under side thereof, and adapted to register with radial depressions provided in the lower plate.

2. A fifth wheel for vehicles comprising two plates adapted to be slidably secured together, one above the other, the upper plate being provided with a plurality of radial projections extending from the under side thereof, equidistantly spaced apart, and adapted to register with a like number of radial depressions similarly spaced apart provided in the said lower plate.

3. A fifth wheel for vehicles comprising two plates, a bolt securing the plates together one above the other, a plurality of radial projections extending from the under side of the upper plate, and adapted to engage with a like number of radial depressions provided in the lower plate, and a spring secured around the lower end of the said bolt forming a flexible connection between the said plates.

4. A fifth wheel for vehicles comprising two plates, flexible means for securing the plates together, one above the other, the upper plate having a plurality of radial projections extending from the underside thereof, equidistantly spaced apart, the lower plate having a like number of radial depressions provided therein and similarly spaced apart, the said projections on the upper plate adapted to register in the depressions in the lower plate and secure the plates in locked position.

In testimony whereof I affix my signature in presence of two witnesses.

EDWARD PRYOR.

Witnesses:
E. WALTON BREWINGTON,
BROWN M. ALLEN.